United States Patent [19]

Weider et al.

[11] Patent Number: 5,164,474
[45] Date of Patent: Nov. 17, 1992

[54] AROMATIC POLYESTERS AND POLYESTER-CARBONATES HAVING SPECIFIC FLUORINE-CONTAINING BISPHENOL COMPONENTS, THEIR PREPARATION AND THEIR USE

[75] Inventors: Richard Weider, Leverkusen; Michael Negele, Cologne, both of Fed. Rep. of Germany

[73] Assignee: Bayer Aktiengesellschaft, Leverkusen, Fed. Rep. of Germany

[21] Appl. No.: 641,193

[22] Filed: Jan. 15, 1991

[30] Foreign Application Priority Data

Jan. 24, 1990 [DE] Fed. Rep. of Germany ....... 4001934

[51] Int. Cl.$^5$ ..................... C08G 63/00; C08G 63/02; C08G 63/04
[52] U.S. Cl. ................................... 528/190; 528/176; 528/193; 528/194; 528/271; 528/272
[58] Field of Search ............... 528/125, 176, 190, 193, 528/194

[56] References Cited

U.S. PATENT DOCUMENTS

| | | | |
|---|---|---|---|
| 3,438,938 | 4/1969 | Oxenrider et al. | 528/190 |
| 4,985,532 | 1/1991 | Pakull et al. | 528/190 |
| 5,025,065 | 6/1991 | Tacke et al. | 528/190 |
| 5,041,521 | 8/1991 | Serini et al. | 528/176 |

FOREIGN PATENT DOCUMENTS 8202390  7/1982  World Int. Prop. O.

*Primary Examiner*—John Kight, III
*Assistant Examiner*—T. Mosley
*Attorney, Agent, or Firm*—Sprung Horn Kramer & Woods

[57] ABSTRACT

New aromatic polyesters and polyester-carbonates are prepared by the reaction of bisphenols of the formula

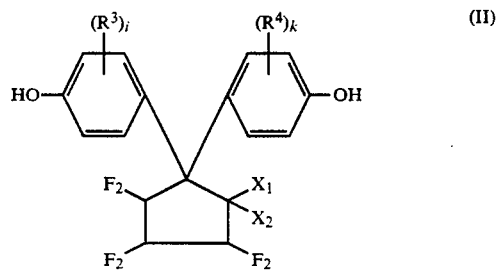

wherein $R^3$ and $R^4$ independently of each other represent $C_1-C_4$ alkyl group or a halogen atom, i and k denote zero or an integer 1 to 4, and $X_1$ and $X_2$ represent fluorine by the two-phase boundary process in an aqueous-alkaline phase with iso- or tere-phthaloyl dichloride. The polyesters and polyester carbonates according to the invention can be processed to form shaped articles by extrusion molding or in an extruder, applied in the form of solutions, or spun to fibers from melt or solution.

13 Claims, No Drawings

AROMATIC POLYESTERS AND POLYESTER-CARBONATES HAVING SPECIFIC FLUORINE-CONTAINING BISPHENOL COMPONENTS, THEIR PREPARATION AND THEIR USE

The present invention relates to new aromatic polyesters and polyester-carbonates having a specific fluorine-containing bisphenol component, their preparation and their use.

Aromatic polyesters having fluorine-containing bisphenol components have already been disclosed (see U.S. Pat. Nos. 3,388,097 and 3,824,211). Where the bisphenol components here contain a perfluorinated cycloalkyl radical, it has to date been possible for them to be reacted only with more than 10% of metaphenylene acid chlorides (isophthaloyl dichloride) (see U.S. Pat. No. 3,388,097). The use of bisphenol components containing perfluorinated cycloalkylene radicals a) as a mixture with fluorine-free bisphenols and b) for the preparation of polyester-carbonates is not known. The properties of the polyesters described in U.S. Pat. No. 3,388,097 are still in need of improvement, in particular in respect of solubility, optical parameters, heat distortion point and heat stability. It has furthermore been found that bisphenols containing perfluorinated cycloalkylene radicals can no longer be prepared by the method described in U.S. Pat. No. 3,388,097, Example 1, if the perfluorocyclobutanone employed in that example is changed to perfluorocyclopentanone. Polyesters and polyester-carbonates having bisphenol components containing a perfluorinated cyclopentylene group have thus previously been inaccessible.

Aromatic polyesters and polyester-carbonates of the formula (I)

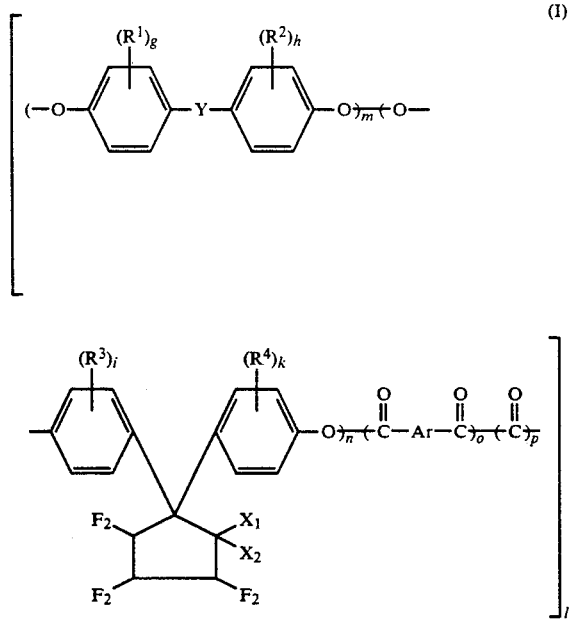

in which
l represents an integer from 2 to 100, m, n, o and p represent the number of moles of the particular components and meet the following conditions p+o=m+n
p:(o+p)=0 to 0.8
n:(m+n)=0.001 to 1

Y represents a single bond, a $C_1$-$C_7$-alkylene radical, a $C_1$-$C_7$-alkylidene radical, a $C_5$-$C_{12}$-cycloalkylene radical, a $C_5$-$C_{12}$-cycloalkylidene radical, a $C_6$-$C_{14}$-alkylcycloalkylidene radical, oxygen, sulphur, S=O, $SO_2$ or C=O, $X_1$ and $X_2$ independently of one another represent fluorine or chlorine, $R^1$ to $R^4$ independently of one another each represent a $C_1$-$C_4$-alkyl group or a halogen atom, g to k independently of one another denote zero or an integer from 1 to 4

Ar denotes meta- and/or para-phenylene, the content of meta-phenylene being less than 10% if m and p are simultaneously zero, have now been found.

In cases where m and p are not simultaneously zero, the molar ratio of meta- to para-phenylene in Ar can be, for example, 0:1 or 1:0. This ratio is preferably 3:7 to 7:3, and is particularly preferably 1:1.

It is an essential feature of polyesters and polyester-carbonates according to the invention that at least some of their bisphenol content originates from bisphenols of the type 1,1-bis-hydroxyphenyl-hexafluorodichloro-, -heptafluoromonochloro- or -octafluorocyclopentane.

Preferred polyesters of the formula (I) are characterized in that
l represents an integer from 15 to 100,
p represents zero,
m, n and o represent the number of moles of the particular components and meet the following conditions
o=m+n
n:(m+n)=0.05 to 0.99,
Y has the abovementioned meaning,
$X_1$ and $X_2$ represent fluorine,
$R^1$, $R^2$, g and h have the abovementioned meaning,
i and k represent zero and
Ar denotes meta- and/or para-phenylene, the molar ratio of meta- to para-phenylene being in the range from 7:3 to 3:7.

Preferred polyester-carbonates of the formula (I) are characterized in that
l represents an integer from 15 to 100,
m, n, o and p represent the number of moles of the particular component and meet the following conditions
p+o=m+n
p:(o+p)=0.01 to 0.5,
n:(n+m)=0.05 to 1,
Y has the abovementioned meaning,
$X_1$ and $X_2$ represent fluorine, and
$R^1$, $R^2$, g and h have the abovementioned meaning,
i and k represent zero and
Ar denotes meta- and/or para-phenylene, the molar ratio of meta- to para-phenylene being in the range from 7:3 to 3:7.

The polyesters and polyester-carbonates according to the invention can, if they contain a) different bisphenol components and/or b) different

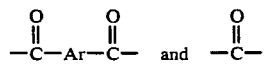

components, contain the particular components mentioned under a) and b) in the form of blocks or in random distribution.

The present invention furthermore relates to a process for the preparation of polyesters and polyester-carbonates of the formula (I), which is characterized in that n mol of bisphenols of the formula (II)

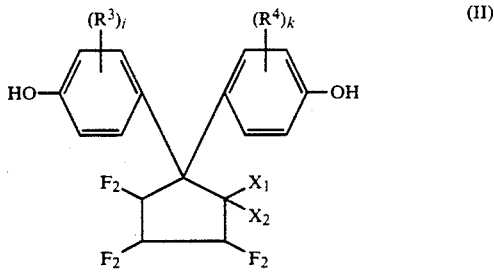

in which the symbols used have the meaning given in the case of formula (I),
if appropriate with the addition of m mol of bisphenols of the formula (III)

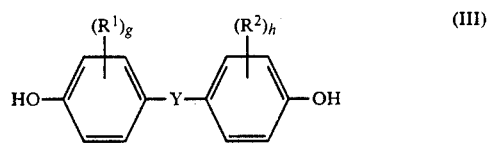

in which the symbols used have the meaning given in the case of formula (I),
are reacted by the two-phase boundary process in an aqueous-alkaline phase with o mol of iso- and/or terephthaloyl dichloride, the content of isophthaloyl dichloride being less than 10 mol % if m and p are simultaneously zero,
if appropriate with the addition of p mol of phosgene, and if appropriate with the addition of catalysts, chain stoppers, colour improvers and/or branching agents, in an organic phase, the following conditions being observed $p+o=m+n$
$p:(o+p)=0$ to $0.8$
$n:(m+n)=0.001$ to $1$.

The two-phase boundary process is a known process for the preparation of polyesters and polyester-carbonates. Details are given, for example, in German Offenlegungsschrift 2,940,024 and German Offenlegungsschrift 3,007,934.

The bisphenol of the formula (II) in which $X_1$ and $X_2$ represent fluorine and i and k represent zero is particularly preferred.

Bisphenols of the formula (II) can be obtained by reacting a fluorine-containing cyclopentanone of the formula (IIa)

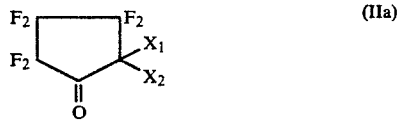

in which
$X_1$ and $X_2$ independently of one another represent fluorine or chlorine,
with at least twice the molar amount of one or more aryl compounds of the formula (IIb)

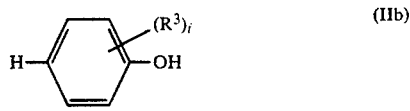

in which
$R^3$ represents a $C_1$-$C_4$-alkyl group or a halogen atom and
i represents zero or an integer from 1 to 4,
in the presence of anhydrous hydrofluoric acid.

Fluorine-containing cyclopentanones of the formula (IIa) are accessible, for example, in accordance with J. Org. Chem. 33, 2693 (1968) or U.S. Pat. Nos. 3,129,248, 3,341,602 and 3,321,515. The bisphenols of the formula (II) and a process for their preparation are included in their own separate patent application.

Bisphenols of the formula (III) are known. Examples which may be mentioned are dihydroxydiphenyls, bis-(hydroxyphenyl)-alkanes, -cycloalkanes, sulphides, ethers, ketones, sulphoxides and sulphones and nuclear-$C_1$-$C_4$-alkylated and nuclear-halogenated derivatives thereof. Preferred bisphenols of the formula (III) are: bisphenol A, tetramethyl-bisphenol A, 1,1-bis-(4-hydroxyphenyl)-isobutane, 1,1-bis-(4-hydroxyphenyl)-cyclohexane, 1,1-bis-(4-hydroxyphenyl)-3,3,5-trimethyl-cyclohexane, 4,4'-dihydroxydiphenyl sulphide, 4,4'-dihydroxydiphenyl sulphone and derivatives thereof which are di-, tri- or tetra-halogenated in the nucleus. It is also possible to use any desired mixtures of different bisphenols of the formula (III). Bisphenol A is particularly preferred.

The bisphenols of the formulae (II) and if appropriate (III) are dissolved in an aqueous-alkaline phase, to which colour improvers may be added if appropriate. Colour improvers can be, for example, reducing compounds, such as sodium borohydride or sodium bisulphite, which can be employed, for example, in amounts of 0.1 to 10% by weight, based on the sum of the bisphenols.

If appropriate, catalysts can furthermore be added to the aqueous-alkaline phase. Examples which may be mentioned are: quaternary ammonium compounds, quaternary phosphonium compounds and tertiary amines. These can be employed, for example, in amounts of 0.5 to 5 mol %, based on the sum of the bisphenols.

To carry out the two-phase boundary process, an organic solvent which is not miscible with the aqueous-alkaline phase, for example methylene chloride, chloroform, trichloroethylene, tetrachloroethylene, tetrachloroethane, chlorobenzene, dichlorobenzenes or mixtures thereof, is then added.

The iso- and/or terephthaloyl dichloride can be employed as a solution in one of the solvents described above which is not miscible with the aqueous-alkaline phase.

Possible chain stoppers to be employed if appropriate are, for example, phenol, $C_1$-$C_{12}$-alkyl-phenols, halogenated phenols, hydroxydiphenyl, naphthols and chlorocarbonic acid esters of such phenolic compounds, and also chlorides of aromatic monocarboxylic acids, which can optionally be substituted by $C_1$-$C_{12}$-alkyl groups and/or halogen atoms. Chain stoppers can be employed, for example, in amounts of 0.1 to 10 mol %, based on the bisphenols employed (in the case of, phenolic types) or based on the iso- and terephthaloyl dichlorides employed (in the case of monocarboxylic acid chloride types). They can be added before or during the reaction, for example together with the bisphenol or bisphenols, together with the iso- and/or terephthaloyl dichloride, separately from the reactants during the reaction and/or after preparation of a precondensate. Chain stoppers of the monocarboxylic acid chloride or chlorocarbonic acid ester type are preferably employed together with iso- and/or terephthaloyl dichloride and/or together with phosgene. They can also still be added when the iso- and/or terephthaloyl dichloride and/or phosgene have already reacted substantially or completely.

The relative solution viscosity of aromatic polyesters and polyester-carbonates according to the invention can be varied by the amount of chain stoppers. The viscosity is in general in the range from 1.18 to 2.0, preferably from 1.2 to 1.5 (measured on 0.5% strength by weight solutions in methylene chloride at 25° C.).

The branching agents which can be employed according to the invention can be, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, or phenols which are trifunctional or more than trifunctional, such as fluoroglucinol, 4,6-dimethyl-2,4,6-tri-(4-hydroxyphenyl)-hept-2-ene, 4,6-dimethyl2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenyl, tetra-(4-hydroxyphenyl)-methane, 2,6-bis-(2-hydroxy-5-methyl-benzyl)-4-methyl-phenyl, 2-(4-hydroxyphenyl)-2-(2,4-dihydroxyphenyl)-propane, tetra-[4-(4-hydroxyphenyl-isopropyl)phenoxy]-methane or 1,4-bis-[(4,4''-dihydroxytriphenyl)methyl]-benzene. Branching agents can be used, for example, in amounts of 0.01 to 1.0 mol %, based on the bisphenols employed (in the case of phenolic types) or based on the iso- and terephthaloyl dichloride employed (in the case of carboxylic acid chloride types). Phenolic branching agents can be initially introduced into the reaction vessel together with the bisphenols, and carboxylic acid chloride branching agents can be introduced together with the carboxylic acid dichlorides.

The polyesters and polyester-carbonates according to the invention are preferably prepared at temperatures in the range from 0° to 40° C., in particular 15° to 30° C., with intensive stirring.

When the reaction has ended, the polyester prepared or the polyester-carbonate prepared can be isolated, for example, by stripping off the organic phase of the reaction mixture, washing it with water or dilute acid until neutral, drying it and stripping off the solvent or solvents in vacuo.

The polyesters and polyester-carbonates according to the invention can, for example, be processed to shaped articles in injection moulding machines or to semi-finished products in extruders or applied in the form of solutions or spun to fibres from the melt or from solution, by customary processes.

Polyesters and polyaster-carbonates according to the invention are distinguished by a number of particular properties, such as, for example, low refractive index, low water uptake, excellent fire repellancy, excellent solubility in a large number of organic solvents and high thermal stability and are superior here to the fluorine-containing polyesters which are already known. Polyesters and polyester-carbonates according to the invention therefore have diverse uses, for example as injection-moulded articles, extruded articles, fibres, films, coatings and varnishes, for example in illumination engineering, electrical engineering and/or in electronic components.

EXAMPLES

General description of the preparation processes a) Preparation of polyesters 0.1 mol of the bisphenol or bisphenol mixture in question were dissolved in a solution of 10 g of NaOH in 600 ml of water with the addition of 400 ml of methylene chloride and 0.5 mmol of triphenyl-ethyl-phosphonium bromide. 51.7 g of a 40% strength solution of iso- and/or terephthaloyl dichloride in chlorobenzene (corresponding to 0.1 mol of dicarboxylic acid dichloride) and a solution of 2 mmol of phenol in 50 ml of methylene chloride were allowed to run simultaneously into the intensively stirred mixture in the course of 15 minutes, the temperature not rising above 22° C. After one hour, the organic phase was separated off, washed neutral with dilute phosphoric acid and water and dried and the solvents were evaporated off in vacuo.

b) Preparation of polyester-carbonates 0.1 mol of the bisphenol or bisphenol mixture in question were dissolved in a solution of 20 g of NaOH in 600 ml of water with the addition of 400 ml of methylene chloride and 0.5 mmol of triethyl-benzyl-ammonium chloride. The calculated amount of a 40% strength solution of iso- and/or terephthaloyl dichloride in chlorobenzene and a solution of 2 mmol of phenol in 50 ml of methylene chloride were allowed to run simultaneously into the intensively stirred mixture in the course of 15 minutes and the mixture was subsequently stirred for one hour, the temperature not rising above 22° C. Phosgene was then passed in, while stirring was continued, the total amount of dicarboxylic acid dichloride and phosgene always being 0.1 mol. The temperature was kept between 20° and 22° C. and the pH was kept at 12 to 13 by addition of 40% strength NaOH. After the introduction of the phosgene, 0.1 ml of triethylamine was added and the mixture was subsequently stirred for a further hour. Working up was then carried out as for the polyesters.

The following preparation examples were carried out specifically, the particular relative molar amounts of the various substances stated being employed and particular relative solution viscosities ($\eta_{rel}$) stated being measured at 25° C. in 0.5% strength by weight solutions, in methylene chloride, of the particular product prepared. The details can be seen from Table 1.

TABLE 1

| Example No. | BPA | BPAF | BHBOFCP | Terephthaloyl dichloride | Isophthaloyl dichloride | Phosgene | $\eta_{rel}$ |
|---|---|---|---|---|---|---|---|
| 1 | 100 | 0 | 0 | 47.5 | 47.5 | 5 | 1.32 |

TABLE 1-continued

| Example No. | BPA | BPAF | BHBOFCP | Terephthaloyl dichloride | Isophthaloyl dichloride | Phosgene | $\eta_{rel}$ |
|---|---|---|---|---|---|---|---|
| 2 | 100 | 0 | 0 | 40 | 40 | 20 | 1.30 |
| 3 | 95 | 5 | 0 | 50 | 50 | 0 | 1.36 |
| 4 | 90 | 10 | 0 | 50 | 50 | 0 | 1.38 |
| 5 | 80 | 20 | 0 | 50 | 50 | 0 | 1.39 |
| 6 | 95 | 0 | 5 | 50 | 50 | 0 | 1.35 |
| 7 | 90 | 0 | 10 | 50 | 50 | 0 | 1.32 |
| 8 | 80 | 0 | 20 | 50 | 50 | 0 | 1.39 |
| 9 | 0 | 100 | 0 | 47.5 | 47.5 | 5 | 1.36 |
| 10 | 0 | 0 | 100 | 47.5 | 47.5 | 5 | 1.34 |
| 11 | 0 | 0 | 100 | 100 | 0 | 0 | 1.29 |
| 12 | 100 | 0 | 0 | 100 | 0 | 0 | 1.31 |
| 13 | 0 | 100 | 0 | 100 | 0 | 0 | 1.28 |

BPA = bisphenol A; BPAF = bistrifluoromethyl-bisphenol A; BHBOFCP = 1,1-bis-(4-hydroxybenzyl),-octafluorocyclopentane. Examples 6, 7, 8, 10 and 11 are according to the invention and the others are for comparison

EXAMPLES 14 TO 18

The solubilities of polyesters and polyester-carbonates according to the invention and not according to the invention were determined as can be seen from Table 2. Products of similar composition are to be compared here, that is to say Examples 14, 15 and 16 with one another and Examples 17 and 18 with one another, but not products of very different composition, that is to say not Examples 16 and 17 with one another.

In Table 2 the symbols have the following meanings:
− not soluble
0 slightly soluble
+ soluble
+ + readily soluble.

TABLE 2

| Example No. | Product from Example No. | Acetonitrile | Diglyme | Methylglycol acetate | Acetone | Methyl ethyl ketone | Ethyl acetate |
|---|---|---|---|---|---|---|---|
| 14 | 1 | − | 0 | − | − | − | − |
| 15 | 5 | − | + | 0 | 0 | 0 | 0 |
| 16 | 8* | − | + | 0 | 0 | + | 0 |
| 17 | 9 | − | + + | + + | + | + + | + + |
| 18 | 10* | 0 | + + | + + | + + | + + | + + |

*products according to the invention

EXAMPLES 19 TO 21

The refractive index $n^{20}{}_D$ and the Abbé number of a product according to the invention and of comparison products were measured. Details can be seen from Table 3. It was found that products according to the invention simultaneously have a low refractive index and a low Abbé number.

TABLE 3

| Example No. | Product from Example No. | Refractive index $n_D{}^{20}$. | Abbé number |
|---|---|---|---|
| 19 | 1 | 1.605 | 26 |
| 20 | 9 | 1.5582 | 31 |
| 21 | 10* | 1.5494 | 30 |

*product according to the invention

EXAMPLES 22 TO 24

The water uptake of a product according to the invention and of comparison products was measured after storage in water. Details can be seen from Table 4.

TABLE 4

| Example No. | Product from Example No. | Water uptake (% by weight) after 4 hours | Water uptake (% by weight) after 4 days |
|---|---|---|---|
| 22 | 1 | 0.15 | 0.19 |
| 23 | 5 | 0.09 | 0.10 |
| 24 | 8* | 0.06 | 0.09 |

*product according to the invention

EXAMPLES 25 TO 27

The fire repellancy of a product according to the invention and of comparison products was measured. Details can be seen from Table 5.

TABLE 5

| Example No. | Product from Example No. | Further burning time (seconds) |
|---|---|---|
| 25 | 1 | 15 |
| 26 | 5 | 4 |
| 27 | 8* | 0 |

*according to the invention

EXAMPLES 28 TO 33

The heat stability of products according to the invention and comparison products was measured by means of thermogravimetric analysis by determination of the weight losses at 550° C. and 650° C. The heating up rate in these experiments was 20° C. per minute. The measurement was carried out on air. Details can be seen from Table 6.

TABLE 6

| Example No. | Product from Example No. | Weight loss (%) at 550° C. | Weight loss (%) at 650° C. |
|---|---|---|---|
| 28 | 4 | 53.5 | 35.5 |
| 29 | 7* | 48 | 40.5 |
| 30 | 5 | 48 | 43 |
| 31 | 8* | 43 | 45 |
| 32 | 9 | 35 | 58 |
| 33 | 10* | 30 | 63 |

*products according to the invention

The examples to be compared are only Examples 28 with 29, 30 with 31 and 32 with 33, since they each relate to products of similar composition. It was found that products according to the invention decompose at a higher temperature.

What is claimed is:

1. An aromatic polyester and polyester-carbonate of the formula (I)

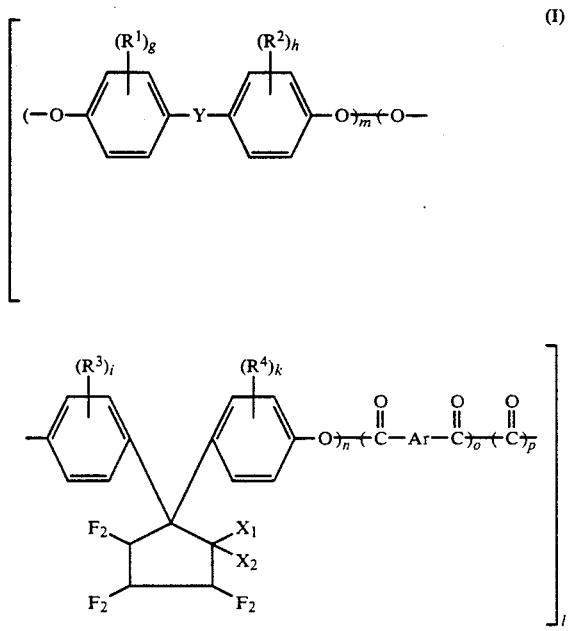

in which
represents in integer from 2 to 100,
m, n, o and p represent the number of moles of the particular components and fulfill the following conditions
p+o=m+n
P:(o+p)=0 to 0.8
n:(m+n)=0.001 to 1
Y represents a single bond, or Y represents a $C_1$-$C_7$-alkylene radical, a $C_1$-$C_7$-alkylidene radical, a $C_5$-$C_{12}$-cycloalkylene radical, a $C_5$-$C_{12}$-cycloalkylidene radical, a $C_6$-$C_{14}$-alkylcycloalkylidene radical, oxygen, sulphur, S=O, $SO_2$ or C=O,
$X_1$ and $X_2$ independently of one another represent fluorine or chlorine,
$R^1$ to $R^4$ independently of one another each represent a $C_1$-$C_4$-alkyl group or a halogen atom,
g to k independently of one another denote zero or an integer from 1 to 4,
Ar denotes meta- or para-phenylene, the content of meta-phenylene being less than 10% when m and p are simultaneously zero.

2. Aromatic polyesters of claim 1, in which
l represents an integer from 15 to 100,
p represents zero,
m, n and o represent the number of moles of the particular components and meet the following conditions
o=m+n
n:(m+n)=0.05 to 0.99,
$X_1$ and $X_2$ represent fluorine,
i and k represent zero and
Ar denotes meta- and/or para-phenylene, the molar ratio of meta- to para-phenylene being in the range from 7:3 to 3:7.

3. Aromatic polyester-carbonates of claim 1, in which represents an integer from 15 to 100,
m, n, o and p represent the number of moles of the particular component and meet the following conditions
p+o=m+n
p:(o+p)=0.01 to 0.5,
n:(n+m)=0.05 to 1,
$X_1$ and $X_2$ represent fluorine,
i and k represent zero and
Ar denotes meta- and/or para-phenylene, the molar ratio of meta- to para-phenylene being in the range from 7:3 to 3:7.

4. A process for the preparation of the polyesters and polyester-carbonates of claim 1, in which n mol of bisphenols of the formula (II)

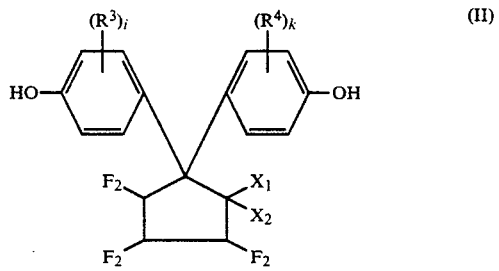

in which the symbols have the meaning given in claim 1,
are reacted by the two-phase boundary process in an aqueous-alkaline phase with o mol of iso- and/or terephthaloyl dichloride, the content of isophthaloyl dichloride being less than 10 mol % if m and p are simultaneously zero,
the following conditions being observed
p+o=m+n
p:(o+p)=0 to 0.8
n:(m+n)=0.001 to 1.

5. The process of claim 4, in which m mol of bisphenols of the formula (III)

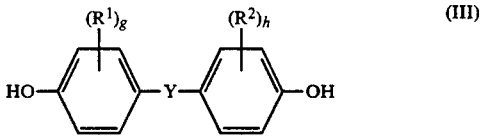

in which the symbols have the meaning given in claim 1, are added.

6. The process of claim 4, in which p mol of phosgene are added.

7. The process of claim 4, in which catalysts, chain stoppers, colour improvers and/or branching agents are added to the organic phase.

8. The process of claim 7, in which sodium borohydride or sodium bisulphite is employed as a colour improver.

9. The process of claim 7, in which quaternary ammonium compounds, quaternary phosphonium compounds or tertiary amines are employed as catalysts.

10. The process of claim 7, in which phenol, $C_1$- to $C_{12}$-alkylphenols, halogenated phenols, hydroxydiphenyl naphthols, chlorocarbonic acid esters of such phenolic compounds or chlorides of aromatic monocarboxylic acids which are unsubstituted or substituted by $C_1$- to $C_{12}$-alkyl groups and/or halogen atoms are employed as chain stoppers.

11. The process of claim 7, in which carboxylic acid chlorides or phenols which are trifunction or more than trifunctional are employed as branching agents.

12. The process of claim 4, which is carried out at 0° to 40° C., with intensive stirring.

13. Articles comprising the polyesters or polyestercarbonates according to claim 1 wherein the articles are injection-molded articles, extrusion articles, fibers, films, coatings, or varnishes.

* * * * *

UNITED STATES PATENT AND TRADEMARK OFFICE
CERTIFICATE OF CORRECTION

PATENT NO.  : 5,164,474

DATED       : November 17, 1992

INVENTOR(S) : Weider, et al.

It is certified that error appears in the above-identified patent and that said Letters Patent is hereby corrected as shown below:

| | |
|---|---|
| Title Page | ABSTRACT: Line 6 before " 1 " insert " from " |
| Col. 9, line 37 | Before " represents " insert -- 1 --; delete " in " and substitute -- an -- |
| Col. 9, line 39 | Delete " fulfill " and substitute -- meet -- |
| Col. 9, line 44 | Delete " or Y represents " |
| Col. 10, line 5 | Before " represents " insert " 1 " |
| Col. 12, line 1 | Delete " trifunction " and substitute -- trifunctional -- |

Signed and Sealed this

Fifth Day of April, 1994

Attest:

BRUCE LEHMAN

*Attesting Officer*     *Commissioner of Patents and Trademarks*